(12) United States Patent
Boettiger (10) Patent No.: US 7,812,869 B2
(45) Date of Patent: Oct. 12, 2010

(54) CONFIGURABLE PIXEL ARRAY SYSTEM AND METHOD

(75) Inventor: Ulrich C. Boettiger, Boise, ID (US)

(73) Assignee: Aptina Imaging Corporation, Grand Cayman (KY)

( * ) Notice: Subject to any disclaimer, the term of this patent is extended or adjusted under 35 U.S.C. 154(b) by 493 days.

(21) Appl. No.: 11/803,065

(22) Filed: May 11, 2007

(65) Prior Publication Data
US 2008/0278610 A1    Nov. 13, 2008

(51) Int. Cl.
H04N 5/225 (2006.01)
H04N 9/09 (2006.01)
H04N 9/097 (2006.01)
H04N 9/093 (2006.01)

(52) U.S. Cl. ....................... 348/262; 348/263
(58) Field of Classification Search ................. 348/262, 348/263
See application file for complete search history.

(56) References Cited

U.S. PATENT DOCUMENTS

| | | | |
|---|---|---|---|
| 4,761,518 A | 8/1988 | Butt | |
| 4,935,334 A | 6/1990 | Boettiger | |
| 5,055,921 A | 10/1991 | Usui | |
| 5,111,240 A | 5/1992 | Boettiger | |
| 5,291,038 A | 3/1994 | Hanamoto | |
| 5,302,852 A | 4/1994 | Kaneda | |
| 5,345,319 A | 9/1994 | Yu | |
| 5,466,926 A | 11/1995 | Sasano et al. | |
| 5,477,081 A | 12/1995 | Nagayoshi | |
| 5,821,457 A | 10/1998 | Mosley | |
| 5,821,532 A | 10/1998 | Beaman | |
| 5,926,218 A * | 7/1999 | Smith | 348/207.99 |
| 6,297,540 B1 | 10/2001 | Assadi | |
| 6,313,525 B1 | 11/2001 | Sasano | |
| 6,359,323 B1 | 3/2002 | Eom et al. | |

(Continued)

FOREIGN PATENT DOCUMENTS

EP    1 096 785 A2    5/2001

(Continued)

OTHER PUBLICATIONS

U.S. Appl. No. 11/650,215, filed Jan. 5, 2007, by inventor Ulrich Boettiger, entitled "Configurable Pixel Array System and Method".

Primary Examiner—Sinh Tran
Assistant Examiner—Jason A Flohre
(74) Attorney, Agent, or Firm—Kramer Levin Naftalis & Frankel LLP (57) ABSTRACT

Present embodiments relate to techniques for capturing images. One embodiment may include an image sensor, comprising a substrate, a first pixel cell array disposed on the substrate, a first photographic lens arranged to focus light onto the first pixel cell array, a second pixel cell array disposed on the substrate, a second photographic lens arranged to focus light onto the second pixel cell array, and an image coordination circuit configured to coordinate the first array and lens with the second array and lens to provide an image. The first pixel cell array and the first photographic lens may be configured to cooperate to capture a first image of a scene, and the second pixel cell array and the second photographic lens may be configured to cooperate to capture a second image of the scene.

16 Claims, 8 Drawing Sheets

U.S. PATENT DOCUMENTS

| | | |
|---|---|---|
| 6,403,881 B1 | 6/2002 | Hughes |
| 6,437,412 B1 | 8/2002 | Higuchi |
| 6,455,831 B1 | 9/2002 | Bandera et al. |
| 6,455,925 B1 | 9/2002 | Laureanti |
| 6,465,141 B2 | 10/2002 | Boettiger |
| 6,475,824 B1 | 11/2002 | Kim |
| 6,489,670 B1 | 12/2002 | Peterson |
| 6,495,895 B1 | 12/2002 | Peterson |
| 6,538,830 B2 | 3/2003 | Boettiger |
| 6,545,829 B1 | 4/2003 | Boettiger |
| 6,577,379 B1 | 6/2003 | Boettiger |
| 6,645,783 B1 | 11/2003 | Brunner |
| 6,674,159 B1 | 1/2004 | Peterson |
| 6,696,738 B1 | 2/2004 | Tu |
| 6,707,125 B2 | 3/2004 | Harazono |
| 6,774,447 B2 | 8/2004 | Kondo |
| 6,784,975 B2 | 8/2004 | Boettiger |
| 6,794,100 B2 | 9/2004 | Boettiger |
| 6,833,873 B1 | 12/2004 | Suda |
| 6,859,229 B1 | 2/2005 | Suda |
| 6,888,566 B2 * | 5/2005 | Larkin et al. ............. 348/208.4 |
| 6,905,975 B2 | 6/2005 | Boettiger |
| 6,952,228 B2 | 10/2005 | Yoneda et al. |
| 6,970,195 B1 | 11/2005 | Bidermann et al. |
| 6,995,911 B2 | 2/2006 | Boettiger |
| 7,006,598 B2 | 2/2006 | Morii et al. |
| 7,012,315 B1 | 3/2006 | Campbell |
| 7,012,754 B2 | 3/2006 | Boettiger |
| 7,038,762 B2 | 5/2006 | Boettiger |
| 7,042,644 B2 | 5/2006 | Nishikawa |
| 7,046,340 B2 | 5/2006 | Boettiger |
| 7,068,432 B2 | 6/2006 | Boettiger |
| 7,153,778 B2 | 12/2006 | Busch |
| 7,176,962 B2 * | 2/2007 | Ejima ..................... 348/208.4 |
| 7,190,039 B2 | 3/2007 | Boettiger |
| 7,199,347 B2 | 4/2007 | Li |
| 7,199,348 B2 | 4/2007 | Olsen et al. |
| 7,199,931 B2 | 4/2007 | Boettiger |
| 7,205,526 B2 | 4/2007 | Li |
| 7,206,136 B2 | 4/2007 | Labaziewicz et al. |
| 7,408,572 B2 | 8/2008 | Baxter et al. |
| 7,564,019 B2 | 7/2009 | Olsen et al. |
| 2002/0020845 A1 | 2/2002 | Ogura et al. |
| 2002/0089596 A1 | 7/2002 | Suda |
| 2002/0113888 A1 * | 8/2002 | Sonoda et al. ............. 348/315 |
| 2003/0086013 A1 | 5/2003 | Aratani |
| 2004/0100570 A1 | 5/2004 | Shizukuishi |
| 2004/0223071 A1 | 11/2004 | Wells |
| 2004/0246351 A1 | 12/2004 | Hiatt |
| 2005/0078377 A1 | 4/2005 | Li |
| 2005/0110104 A1 | 5/2005 | Boettiger |
| 2005/0128509 A1 | 6/2005 | Tokkonen et al. |
| 2005/0128596 A1 | 6/2005 | Li |
| 2005/0134712 A1 | 6/2005 | Gruhlke et al. |
| 2005/0160112 A1 | 7/2005 | Makela et al. |
| 2005/0225654 A1 | 10/2005 | Feldman |
| 2005/0233588 A1 | 10/2005 | Boettiger |
| 2005/0270651 A1 | 12/2005 | Boettiger |
| 2005/0280012 A1 | 12/2005 | Boettiger |
| 2006/0009042 A1 | 1/2006 | Busch |
| 2006/0023312 A1 | 2/2006 | Boettiger |
| 2006/0027887 A1 | 2/2006 | Boettiger |
| 2006/0066750 A1 | 3/2006 | Henderson et al. |
| 2006/0119950 A1 | 6/2006 | Boettiger |
| 2006/0139470 A1 | 6/2006 | McGowan |
| 2006/0152610 A1 | 7/2006 | Voronov et al. |
| 2006/0152813 A1 | 7/2006 | Boettiger |
| 2006/0158631 A1 | 7/2006 | Boettiger |
| 2006/0175287 A1 | 8/2006 | Boettiger |
| 2006/0176566 A1 | 8/2006 | Boettiger |
| 2006/0177959 A1 | 8/2006 | Boettiger |
| 2006/0181692 A1 | 8/2006 | Boettiger |
| 2006/0186492 A1 | 8/2006 | Boettiger |
| 2006/0187554 A1 | 8/2006 | Boettiger |
| 2006/0268143 A1 | 11/2006 | Boettiger |
| 2006/0275941 A1 | 12/2006 | Oliver |
| 2006/0289723 A1 | 12/2006 | Li |
| 2006/0289956 A1 | 12/2006 | Boettiger |
| 2006/0292735 A1 | 12/2006 | Boettiger |
| 2007/0023799 A1 | 2/2007 | Boettiger |
| 2007/0035844 A1 | 2/2007 | Li |
| 2007/0045685 A1 | 3/2007 | Yang |
| 2007/0076299 A1 | 4/2007 | Boettiger |

FOREIGN PATENT DOCUMENTS

| | | |
|---|---|---|
| EP | 1 215 729 A2 | 6/2002 |
| JP | 2002-043555 | 2/2002 |
| WO | WO 99/65248 | 12/1999 |
| WO | WO 2006/026354 A2 | 3/2006 |

* cited by examiner

CONFIGURABLE PIXEL ARRAY SYSTEM AND METHOD

BACKGROUND OF THE INVENTION

1. Field of the Invention

The present invention relates generally to the field of semiconductor devices and more particularly to multi-array image sensor devices.

2. Description of the Related Art

Digital cameras, much like conventional cameras, generally include a lens or series of lenses that focus light to create an image of a target scene. The lens or series of lenses may be referred to as a photographic lens or objective lens. A photographic lens may be utilized to focus and/or magnify an image. In contrast to photographic lenses in conventional cameras, which focus light onto film, digital cameras utilize photographic lenses to focus light onto a semiconductor device that records the light electronically at individual image points (e.g., pixels or photosites). For example, instead of film, a digital camera may include a sensor (e.g., a charge coupled device (CCD) or a complementary metal oxide semiconductor (CMOS)) that converts light into electrical charges. These electrical charges are essentially stored or recorded. Once the light is recorded as electrical charges, a computer may process the recorded light into digital data that may be used to provide images.

Traditional digital camera sensors typically include an array of sensor pixel cells or photosites that convert light into electricity. The number of pixels or photosites utilized by a digital camera generally determines the resolution (i.e., the amount of detail) of images captured by the camera. These photosites are essentially colorblind. In other words, the photosites merely convert light into electricity based on the total intensity of light that strikes the surface. Accordingly, digital cameras typically utilize color filters and microlenses for each photosite to provide color images. For example, a sensor may have red, blue, and green filters disposed in a Bayer filter pattern over the photosites, and the microlenses may direct light into each photosite via the associated filter. Once the camera sensor records all three colors, values relating to the colors may be stored or transmitted for use in a rendering system to recreate a full spectrum. However, crosstalk among pixels (e.g., light passing through a filter and striking a photosite adjacent the intended photosite) can reduce color reconstruction capabilities. Further, other aspects of traditional digital camera sensors can limit functionality and versatility.

DETAILED DESCRIPTION OF SPECIFIC EMBODIMENTS

Embodiments of the present invention are directed to multi-array image sensor devices (e.g., miniaturized multi-array image sensor devices) for use in digital cameras. In contrast to traditional digital camera sensors which typically include a single monolithic array of pixels or photosites, present embodiments include flexibly sized clusters of pixels on a single die with each cluster having its own imaging lens system and/or filter above it. These arrangements of lenses, pixel clusters, and filters essentially form multiple embedded mini-cameras (i.e., small functional cameras) on each die. In accordance with present embodiments, the clusters for each mini-camera may be configured with differently sized pixels, different pixel arrangements, multiple lens types, and/or multiple color filter arrangements (e.g., a single color filter, no color filter, or a mosaic filter) based on the desired operation of the mini-camera.

Combining and integrating multiple and possibly different pixel arrays on a single imager die can facilitate flexible and intelligent image acquisition or capture. For example, multiple cameras on a single imager die may operate interdependently in accordance with present embodiments to enhance functionality and provide versatile imaging. Additionally, present embodiments may improve a camera's physical efficiency. For example, wafer level integration of lenses, as provided in accordance with present embodiments, facilitates adding miniaturized optics with precision and at low cost. Further, since the arrays can be smaller than in a traditional monolithic array camera with comparable resolution, the resulting camera may be substantially thinner than traditional cameras.

Because characteristics (e.g., lens type, filter arrangements, pixel arrangements) of the mini-cameras are flexible, each mini-camera can be optimized for a specific aspect of imaging (e.g., flexible exposure metering, motion sensing, blur reduction, and increasing dynamic range). Indeed, by combining the performances of multiple pixel arrays or clusters in accordance with present embodiments, it is believed that more versatile imaging results may be achieved than would be achieved with the large monolithic arrays utilized in traditional digital cameras (e.g., digital photo and video cameras). It should be noted that the terms "pixel," "pixel cell," or "photosite" may refer to a picture element unit cell containing a photo-conversion device for converting electromagnetic radiation (e.g., light) into an electrical signal.

Figure 1:
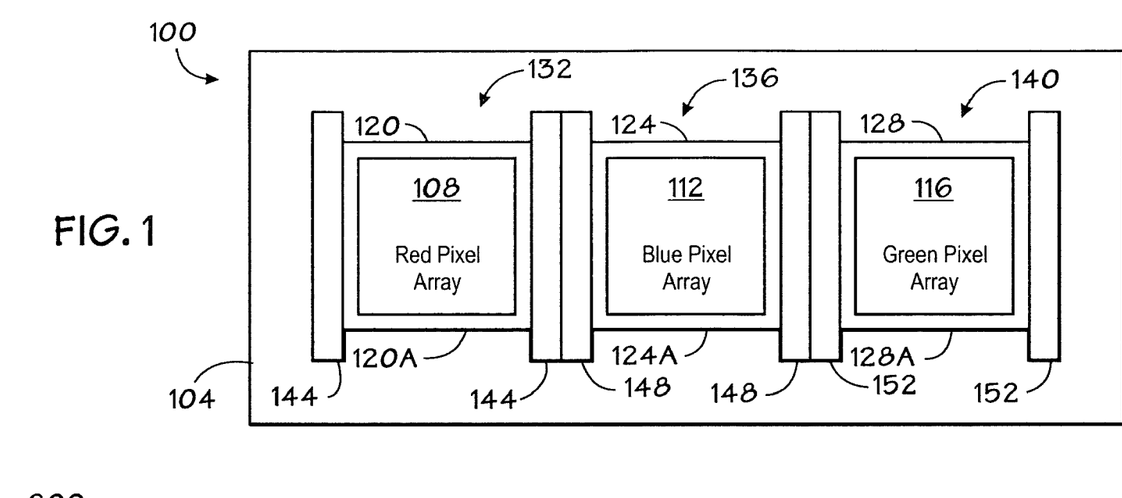
FIG. 1 is a top plan view of a multi-array image sensor with three mini-cameras in accordance with an embodiment of the present invention.

FIG. 1 is a top plan view of a multi-array image sensor 100 in accordance with an embodiment of the present invention. Image sensor 100 includes a substrate 104, a red pixel array 108, a blue pixel array 112, and a green pixel array 116. It should be noted that while three arrays are illustrated in FIG. 1, the number of arrays is only limited to efficiently provide an example. Indeed embodiments of the present invention may include many arrays working together. Each pixel array 108, 112, and 116 includes a corresponding photographic lens. Specifically, with respect to the position of the substrate 104 as a base, the red pixel array 168 is disposed beneath a first photographic lens 120, the blue pixel array 112 is disposed beneath a second photographic lens 124, and the green pixel array is disposed beneath a third photographic lens 128. Each pixel array is arranged with other sensor features such that it detects a specific color of light. The color designation (e.g., red, blue, and green) for each pixel array 108, 112, and 116 may be determined by associated filters 120A, 124A, and 128A, which are adjacent to each lens 120, 124, and 128 and/or incorporated within each lens 120, 124 and 128. For example, the red pixel array 108 may be designated as red because it includes or corresponds to a red filter 120A that substantially blocks light other than red light from reaching the red pixel array 108. In some embodiments, color filters may be embedded within the lenses. For example, the filters 120A, 124A, and 128A may be a tint on each lens 120, 124, and 128, respectively. Further, in some embodiments, one or more arrays may not be associated with a filter or may receive light through a clear filter. It should be noted that the term "photographic lens" may be defined as an integrated system comprising one or more simple optical lens elements.

In some embodiments, one or more of the pixel arrays 108, 112, and 116 may be configured to detect multiple colors. For example, in one embodiment, one of the pixel arrays 108, 112, or 116 may be substituted for a pixel array with a Bayer pattern filter instead of a monochrome (i.e., one-color) filter. However, having pixel arrays with uniform color may facilitate the reduction of crosstalk artifacts because the pixel arrays and associated filters can be completely isolated from one another. In other words, using multiple monochrome arrays instead of a single large Bayer array reduces color filter induced diffraction effects in the pixels. For example, when a conventional Bayer array is utilized, some diffraction occurs at the boundaries of neighboring pixels. Present embodiments utilize contiguous color layers, which may include monochrome filters covering a number of pixels, eliminating such interfaces. By limiting or eliminating these interfaces, present embodiments reduce color filter induced diffraction effects in the pixels.

Various benefits are associated with the use of multiple arrays instead of a single monolithic array. For example, with multiple arrays, more than three color filters can be used to improve color rendition without having to pixelate them, which can be an advantage when building imaging devices with arrays of very small pixels for which color filter arrays are very difficult to build. Additionally, components in accordance with present embodiments essentially form multiple mini-cameras with smaller array sizes than a single large array. For the same field of view, this size reduction allows a shorter image distance for the same maximum chief array angle, facilitating a reduction of the height of the optical system, thus allowing a camera in accordance with present embodiments to be thinner than traditional cameras. Or, conversely it can enable a reduction of the maximum chief array angle for the same field of view for improved performance of small pixels.

In the illustrated embodiment of FIG. 1, three mini-cameras 132, 136, and 140 are generally formed by the pixel arrays 108, 112, and 116, the photographic lenses 120, 124, and 128, and/or associated filters 120A, 124A, and 128A. It should be noted that in some embodiments more or fewer mini-cameras may be utilized. Each mini-camera 132, 136, and 140 includes associated blocks of support circuitry. It should be noted that circuits and circuitry may refer to hardware, software, or a combination thereof in accordance with present embodiments. Additionally, in the embodiments set forth herein, illustrated circuitry elements may merely be representative and may be supported by supplemental circuitry or programming.

Specifically, camera 132 includes blocks 144, camera 136 includes blocks 148, and camera 140 includes blocks 152. Each support circuitry block facilitates operation of the associated pixel array. While these blocks of support circuitry 144, 148, and 152 would typically be disposed along the periphery of a traditional sensor (e.g., along the edges of a large monolithic pixel array), in the illustrated embodiment the blocks of support circuitry 144, 148, and 152 are arranged to separate the respective pixel arrays 108, 112, and 116. The separation provided by the support circuitry 144, 148, and 152 substantially prevents crosstalk between arrays, which facilitates color reconstruction (e.g., appropriate mixing of image data to provide an accurate image color). By utilizing the support circuitry 144, 148, and 152 as a crosstalk barrier, space is efficiently utilized on the substrate 104. This efficient use of substrate space facilitates size reduction of any camera utilizing the sensor 100. However, it should be noted that in some embodiments opaque barriers may be utilized to prevent crosstalk instead of the support circuitry 144, 148, and 152.

Because present embodiments utilize separate pixel arrays that have corresponding support circuitry, several other operational benefits may result. Specifically, more accurate images may be captured due to rapid scanning of the arrays. Indeed, during operation, pixel cells in an array may be read out one by one. Accordingly, by using separate arrays instead of a single monolithic array, present embodiments may scan each array in parallel. With multiple separate arrays, shorter signal pathways may be utilized. Thus, more pixels may be scanned in less time, which allows less potential for image distortion due to movement. Additionally, the shorter signal pathways facilitate faster or lower power operation than can be achieved with typical monolithic arrays with the same total number of pixels. In some embodiments, the array may be sized to enable use of a global shutter function, as discussed in further detail below. Further, each array may be configured for substantially optimal thermal management. Indeed, operation may be improved by spacing the arrays to limit heat build-up. A more even distribution of heat sources across the substrate may yield a more uniform dark current, which is the output current of a photodetector with no light at its input, and a more uniform signal response.

Pixel and array sizes, shapes, and arrangements may be adjusted in accordance with present embodiments to optimize or customize each mini-camera 132, 136, and 140 for different imaging tasks. Indeed, each mini-camera 132, 136, and 140 may be configured for a particular primary task by changing the associated pixel and/or array characteristics. For example, the sensitivity and resolution of each mini-camera may be adjusted based on the nature or purpose of each mini-camera. Specifically, for example, high resolution from the blue pixel array 112 of the camera 136 may not benefit a resulting image as much as high resolution from the green pixel array 116 of the camera 140. This discrepancy may be because the human eye is more sensitive to green in an image than blue. Accordingly, in some embodiments, the size of pixels in the blue pixel array 112 may be smaller than in the green pixel array 116. Indeed, the pixels of the blue pixel array 112 may have an area half as large as the pixels of the green pixel array 116, for instance. In addition, the blue pixel array 112 may have fewer pixels than the green pixel array 116, thus reducing detail captured by the blue pixel array 112. This facilitates maximization of the amount of useful image information recorded by the sensor per unit area of silicon or per unit of electric power spent in acquiring the image.

Figure 2:
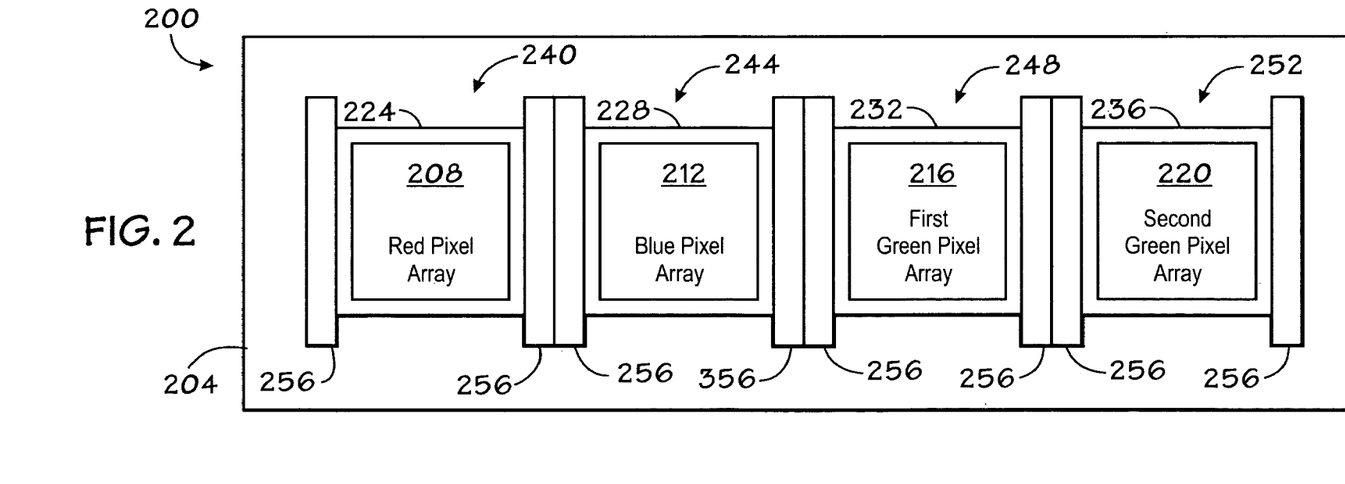
FIG. 2 is a top plan view of a multi-array image sensor with four mini-cameras in accordance with an embodiment of the present invention.

FIG. 2 is a top plan view of a multi-array image sensor 200 in accordance with another embodiment of the present invention. The image sensor 200 includes a substrate 204, a red pixel array 208, a blue pixel array 212, a first green pixel array 216, and a second green pixel array 220. In some embodiments, different color configurations and/or non-filtered pixel arrays may be utilized. Each of the pixel arrays 208, 212, 216, and 220 cooperates with a corresponding photographic lens 224, 228, 232, 236 to form respective mini-cameras 240, 244, 248, and 252. The mini-cameras 240, 244, 248, and 252 may include filters and may be cumulatively or individually configured for specific purposes. For example, the two green pixel arrays 216 and 220 may be included in the sensor 200 to provide additional detail in the green light band, which may improve visibility of a product image to the human eye. Further, the pixel arrays 208, 212, 216, and 220 may be configured such that the ratio of colored pixels is similar to that of a monolithic array with a standard Bayer pattern filter (e.g., one blue pixel and one red pixel for every two green pixels). It should also be noted that, in the illustrated embodiment, the sensor 200 includes a plurality of barriers and/or blocks of support circuitry 256 that separate the pixel arrays 208, 212, 216, and 220 to prevent crosstalk and efficiently utilize sensor space.

Figure 3:
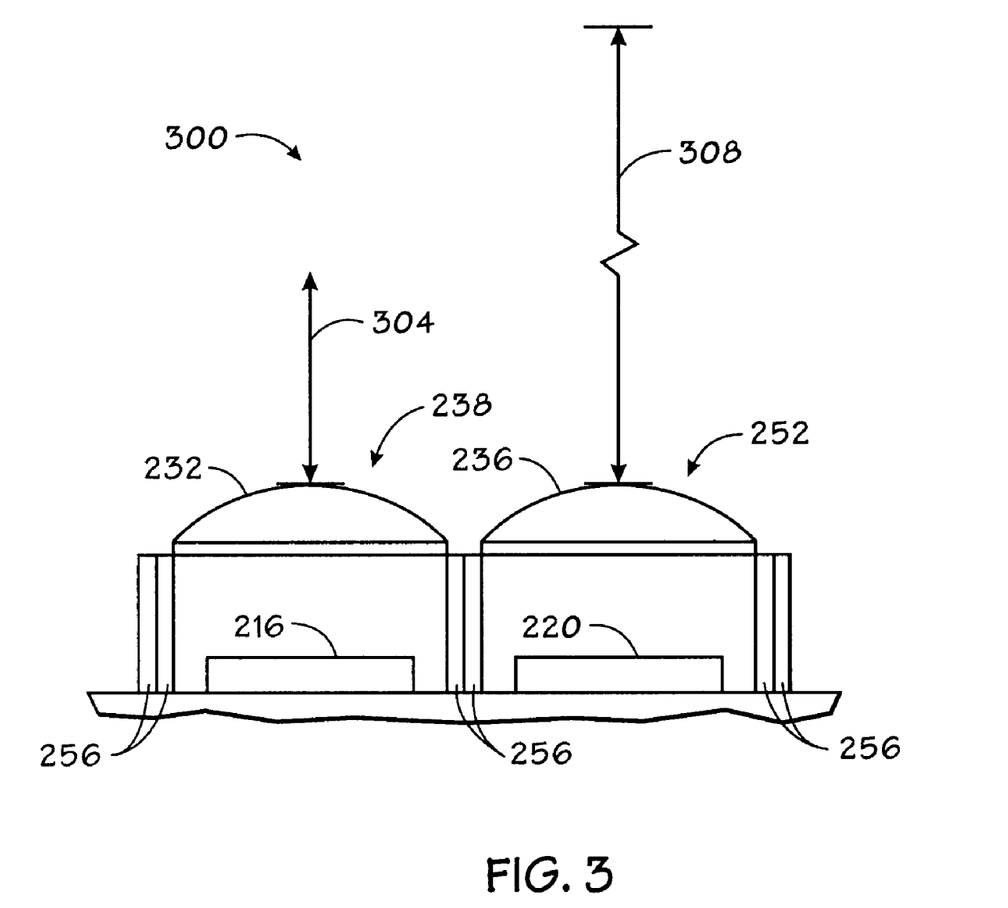
FIG. 3 is a cross-sectional view of two mini-cameras of the multi-array image sensor in FIG. 2, wherein the mini-cameras have different focus distances in accordance with an embodiment of the present invention.

As set forth above, embodiments of the present invention may be configured or adjusted for specific purposes. An example configuration of the image sensor 200 may include focusing the mini-camera 248 associated with the first green pixel array 232 on a nearby location or macro position, and focusing the mini-camera 252 associated with the second green pixel array 236 on a distant location (e.g., infinity). For example, FIG. 3 is a cross-sectional view 300 of the two mini-cameras 248 and 252 of FIG. 2, which shows the focus distances 304 and 308 for each of the cameras 248 and 252. By focusing the two mini-cameras 248 and 252 on different distances/locations, a built-in depth of field enhancement may be achieved after merging the sub-images using suitable image processing. It should be noted that in some embodiments more than two mini-cameras may be utilized to provide the depth of field enhancement. For example, multiple mid-range focused mini-cameras (e.g., stereo cameras) may be utilized to capture images and their product images may be merged with other images to produce a final image. It should be noted that capturing an image may include storing image data. Additionally, the use of multiple mini-cameras may facilitate three-dimensional imaging or depth measurement using the parallax shift between the different mini-cameras.

Figure 4:
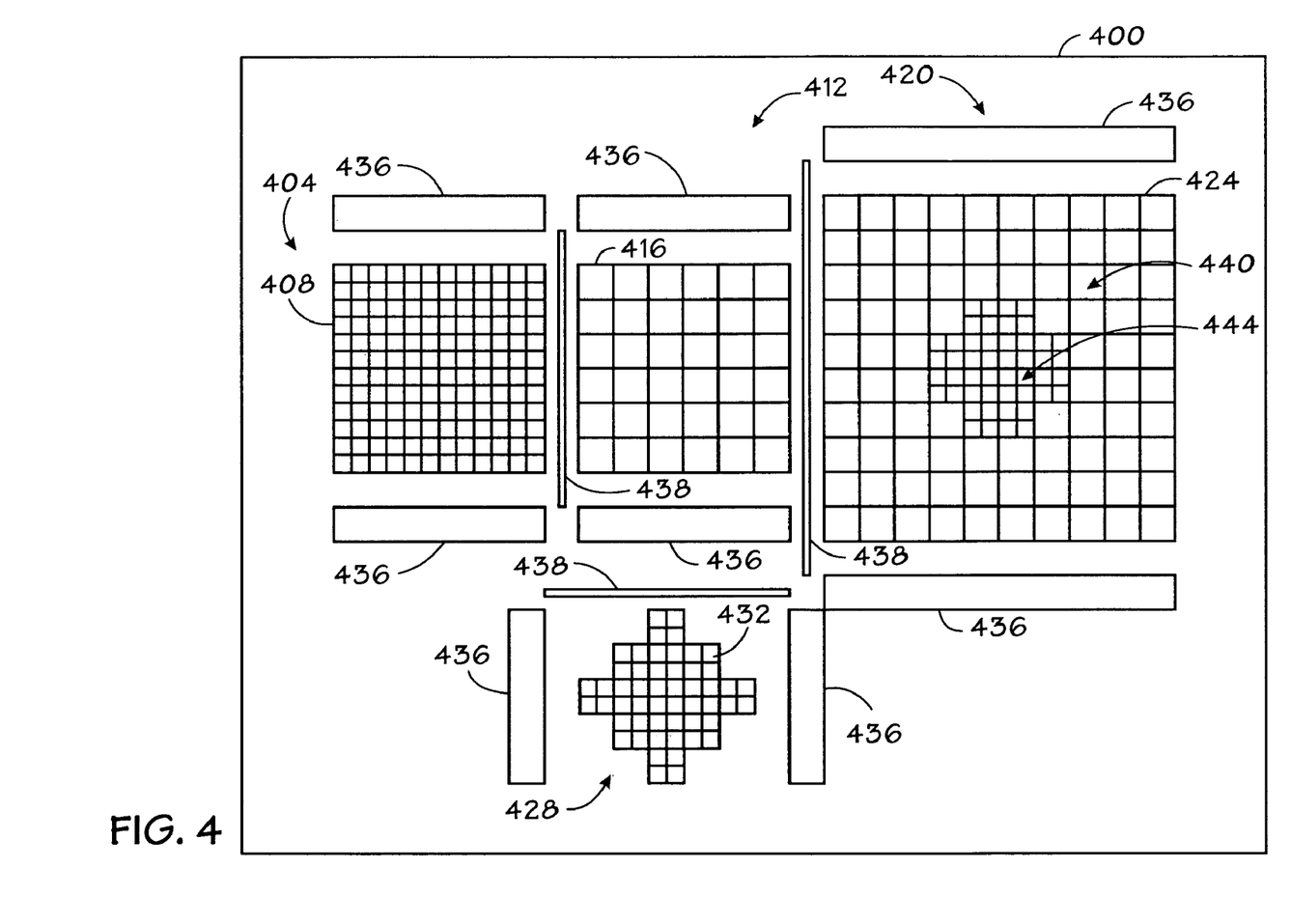
FIG. 4 is a top plan view of a multi-array image sensor with a first mini-camera that includes a high density pixel array, a second mini-camera that includes a low density pixel array, a third mini-camera that includes a peripheral vision array, and a fourth mini-camera that includes a central vision array in accordance with an embodiment of the present invention.

FIG. 4 is yet another embodiment of a sensor with a plurality of mini-cameras configured for specific operations in accordance with embodiments of the present invention. Specifically, FIG. 4 includes a sensor 400 with a first mini-camera 404 that includes a high density pixel array 408, a second mini-camera 412 that includes a low density pixel array 416, a third mini-camera 420 that includes a peripheral vision array 424, and a fourth mini-camera 428 that includes a central vision array 432. Further, each of the mini-cameras 404, 412, 420, and 428 includes associated support circuitry 436. Opaque barriers 438 are disposed adjacent the pixel arrays 408, 416, 424, and 432 to prevent crosstalk between the mini-cameras 404, 412, 420, and 428. The mini-cameras 404, 412, 420, and 428 may cooperate to perform certain tasks and may perform other tasks individually. Specifically, the pixel arrays 408, 416, 424, and 432 in the mini-cameras 404, 412, 420, and 428 may be configured for the specific tasks, as described further below with reference to FIG. 5, which illustrates an implementation of the sensor 400.

Figure 5:
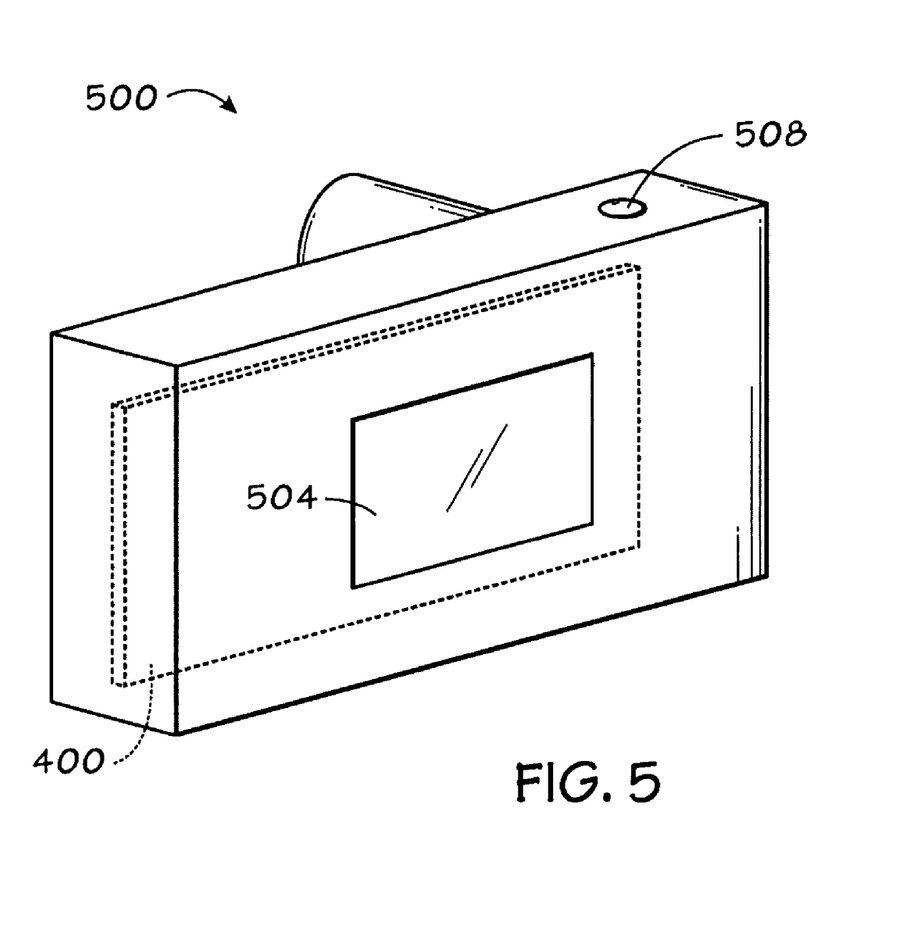
FIG. 5 is a perspective view of a digital camera that includes a sensor in accordance with an embodiment of the present invention.

FIG. 5 is a perspective view of a digital camera 500 that includes the sensor 400 in accordance with an embodiment of the present invention. In the illustrated embodiment, the mini-cameras 404 and 412 on the sensor 400 may cooperate to save battery life in the digital camera 500. For example, the mini-cameras 404 and 412 may cooperate to save energy used by a preview screen 504 of the camera 500, as illustrated in FIG. 5. The preview screen 504 may facilitate observation of a target scene before capturing an image of the scene. While the camera 500 may be capable of capturing images with a very high resolution using the high density pixel array 408, the preview screen 504 may only produce a relatively low resolution image to facilitate picture taking. For example, a user may place the camera 500 in "view finder" mode and use the preview screen 504 to align and/or focus the camera. This limited functionality for the preview screen 504 allows for a low resolution output, which is cost efficient. However, the user may want high resolution pictures to allow for quality enlargements of the resulting photographs and so forth. Accordingly, the high density pixel array 408 may include several mega pixels, while the preview screen 504 may only utilize a few hundred thousand pixels or less.

As indicated above, the preview screen 504 shown in FIG. 5 has lower resolution capabilities compared to the high density pixel array 408 shown in FIG. 4. Accordingly, if the high density pixel array 408 is utilized to produce the image for the preview screen 504, the resolution produced by the high density pixel array 408 should be reduced for display on the preview screen 504. This can create inefficiencies in processing by requiring conversion from high resolution to low resolution. Further, running a high resolution array, such as the high density pixel array 408, may require more power than a lower resolution array. Accordingly, embodiments of the present invention may use the low density array 416 to produce an image on the preview screen 504 for picture alignment and focusing. When the picture is ready to be taken (e.g., an activation button 404 is depressed), the sensor 400 may switch over to the high density array 408 to take the picture. This may simplify operation and reduce the consumption of power by the camera 500. Using the low density array 416 may facilitate low power, fast image acquisition for view finder mode and any video applications of the sensor.

It should be noted that the above-referenced power saving function is merely provided by way of example and many additional functions may also be achieved utilizing combinations of the high density pixel array 408 and the low density pixel array 416. For example, the low density array 416 may be utilized along with a processor to monitor certain conditions (e.g., a blinking light or other optical signal or indicator in the image scene) before activating the high density array 408. In another example, because bigger pixels capture more light, the low density array 416 may be utilized for providing color images while the high density array 408 with no color filters is used to provide monochrome images for high resolution luminescence information about the image. This may be desirable for an application wherein more spatial resolution is desired than color resolution.

In one embodiment, the sensor 400 may utilize the third mini-camera 420 to mimic human peripheral vision. The peripheral vision array 424, which is a component of the mini-camera 420, includes a low density pixel area 440 and a high density pixel area 444. The low density pixel area 440 includes pixels that are larger than those in the high density pixel area 444. Indeed, the pixels in the low density pixel area 440 are approximately twice the size of the pixels in the high density pixel area 444. The high density pixel area 444 is in a central portion of the array 424 and the low density pixel area 440 is around the perimeter of the array 424. Accordingly, images produced using the array 424 may imitate human vision, which focuses on a central item and has less resolution around the perimeter. Also, because the larger pixels in the low density pixel area 440 are more sensitive to light, they may be utilized to detect motion and activate the high density pixel area 444 or a separate array (e.g., high density array 408) to provide a clearer image of an item passing into view. The low density pixel area 440 may include a color filter that is configured to facilitate motion detection (e.g., monochrome). Further, the low density pixel area 440 may include infrared detectors to facilitate detection of movement in the dark. It should also be noted that similar functionality may be achieved using separate arrays. For example, the low density pixel array 416 may be utilized to detect motion and the high density central vision array 432 may be utilized to provide a high resolution view of a central area. The low density pixel area 440 may use no color filter to further enhance its sensitivity to motion detection or it could be equipped with a special uniform color filter to facilitate efficient and rapid detection of movements of elements with a particular color. More than one such array could be used to discern motion of scene elements with specific pre-defined colors. This could be particularly useful in automotive or machine vision applications.

Figure 6:
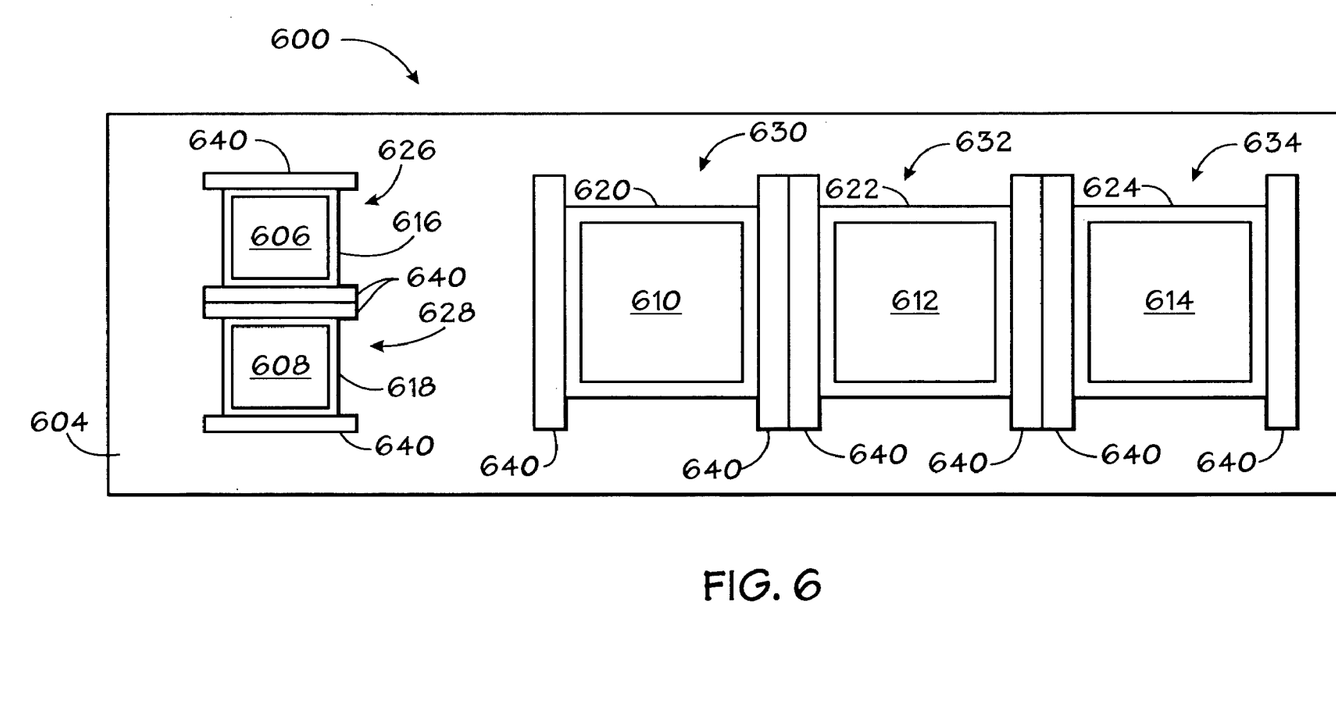
FIG. 6 is a top plan view of a multi-array imaging die or sensor configured for a flexible metering function in accordance with an embodiment of the present invention.

FIG. 6 is a top plan view of a multi-array imaging die or sensor 600 that is configured to provide a flexible metering function in accordance with another embodiment of the present invention. The image sensor 600 includes a substrate 604, a first pixel array 606, a second pixel array 608, a third pixel array 610, a fourth pixel array 612, and a fifth pixel array 614. In some embodiments, a different number and/or arrangement of pixel arrays may be utilized. Each of the pixel arrays 606, 608, 610, 612, and 614 cooperates with a corresponding one of a plurality of photographic lenses 616, 618, 620, 622, and 624 to form respective mini-cameras 626, 628, 630, 632, and 634. The mini-cameras 626, 628, 630, 632, and 634 may include filters and may be cumulatively or individually configured for specific purposes. For example, one or more of the pixel arrays 606, 608, 610, 612, and 614 may be employed as a high resolution exposure meter for measuring scene luminescence in a desired spectral range. In other words, one or more of the pixel arrays 606, 608, 610, 612, and 614 may facilitate measuring an intensity of light falling on a subject (incident reading) or light reflected by the subject (reflected reading) such that shutter and aperture settings may be determined such that they will facilitate obtaining a desirable exposure value for acquiring an image of the subject. In another example, one or more of the pixel arrays 606, 608, 610, 612, and 614 may be utilized to measure scene luminescence and determine focus. In other, words, data may be acquired to facilitate setting a focus position for an associated camera.

In the illustrated embodiment, the first array 606 and the second array 608 may be utilized as the exposure meter. To act as an exposure meter, a pixel array may not require high resolution. Accordingly, in one embodiment, the first array 606 and the second array 608 have relatively few pixels (e.g., low resolution) compared to the other pixel arrays 610, 612, and 614. Additionally, the first and second arrays 606 and 608 may each have, for example, one of a monochrome color filter, no color filter, or a Bayer color filter. Each of the other arrays 610, 612, and 614 may have a different color configuration, resolution and/or filtering arrangement to establish desired imaging capabilities. For example, two of the arrays 610, 612, and 614 may each cooperate with corresponding green color filters and may be configured to provide images as discussed above with respect to FIG. 3. Additionally, each of the arrays 606, 608, 610, 612, and 614 may acquire a sub-image that can be processed and combined with the other sub-images using suitable image processing to provide a superior image with high resolution and dynamic range.

To avoid inaccurate exposure level measurements, one or both of the first array 606 and the second array 608 may have an extra large full well capacity. The extra large full well capacity may facilitate prevention of "blooming," which may be defined as a spill over of electrons from one pixel to one or more neighboring pixels. In describing blooming, it may be useful to note that each pixel in a pixel array may be described as operating similarly to a capacitor. For example, an individual pixel in a pixel array can only hold a certain number of electrons. Accordingly, once a pixel is full, the electrons may spill out of the pixel into nearby pixels that are not full, thus, causing blooming and image distortions. For example, if a pixel is exposed to a bright light for a prolonged period of time, it may overflow with electrons and cause image distortions by filling neighboring pixels with excess electrons. Increasing the well capacity of the pixels in the first array 606 or second array 608 facilitates prevention of blooming. Indeed, increased well capacity enables each pixel to receive more electrons without overflow and, thus, enables more accurate detection of light.

One or both of the first array 606 and the second array 608 may be sized to enable a precise (e.g., full image resolution) and spatially resolved measurement of exposure levels across a scene over a wide dynamic range. Further, the arrays may be configured for activation in a sequence. This allows arrays activated later in the sequence to be adjusted based on previously activated arrays. In one embodiment, the first and/or second arrays 606 and 608 may acquire certain information and the information may be directly stored in full or after some compression/extraction of exposure parameters to reduce required storage. This stored information may then be utilized to control settings of the additional arrays 610, 612, and 614 present on the die to optimize their image acquisition. For example, the first array 606 and/or the second array 608 may acquire information utilized to rapidly auto focus (e.g., set an array's focus position) the other arrays 610, 612, and 614. In another example, the images acquired by the first array 606 and/or the second array 608 may be used as exposure templates for the other arrays 610, 612, and 614. Indeed, initial images acquired by the first array 606 and/or second array 608 may provide information regarding levels of light intensity at particular locations in a scene. Based on this light intensity information, the other arrays 610, 612, and 614 may adjust to accommodate the light levels and to provide a more accurate image of the scene.

In one embodiment, the first and second arrays 606 and 608 may be configured to designate the location of certain bright and dark spots in an image by comparing light levels measured by each pixel in the first and second arrays 606 and 608 with defined brightness thresholds or criteria. It should be noted that this configuration may be achieved in cooperation with other components (e.g., memory). The light and dark spot information may be provided to the higher resolution arrays or imaging arrays 610, 612, and 614 as grid locations (e.g., row X, column Y of a particular array). The imaging arrays 610, 612, and 614 may then utilize this information to adjust integration time for the designated areas to reduce blooming and/or increase image clarity. For example, if a certain area of the image is designated as a bright spot (e.g., above a pre-defined threshold), the integration time may be reduced for the pixels in the designated area to reduce or prevent blooming. Similarly, if a certain area of the image is designated as a dark spot (e.g., below a pre-defined threshold), the integration time may be increased to allow for acquisition of more light in that area and provide an improved image. In another example, integration time and/or amplifier gain may be chosen dynamically for each of the imaging arrays 610, 612, and 614 based on the signal levels measured by the first array 606 and/or the second array 608. Such dynamic manipulation may be achieved by imaging circuitry 640, which may store data that corresponds to certain measured data values (e.g., integration times for measured brightness levels based on empirical data).

In one embodiment, global shutter pixels may be utilized in one or more of the arrays 606, 608, 610, 612, and 614 to facilitate fast, unblurred image acquisition. This may be desirable because some traditional shutters (e.g., rolling shutters) create distortion by acquiring images by populating one line of pixels at a time in the array with image data. For example, a distortion may be caused when an object is moving and it changes position in the time between acquiring image data for a first line of pixels and acquiring image data for a second line of pixels. It should be noted that some embodiments utilize a memory component to hold additional data provided with global shutter pixels.

Figure 7:
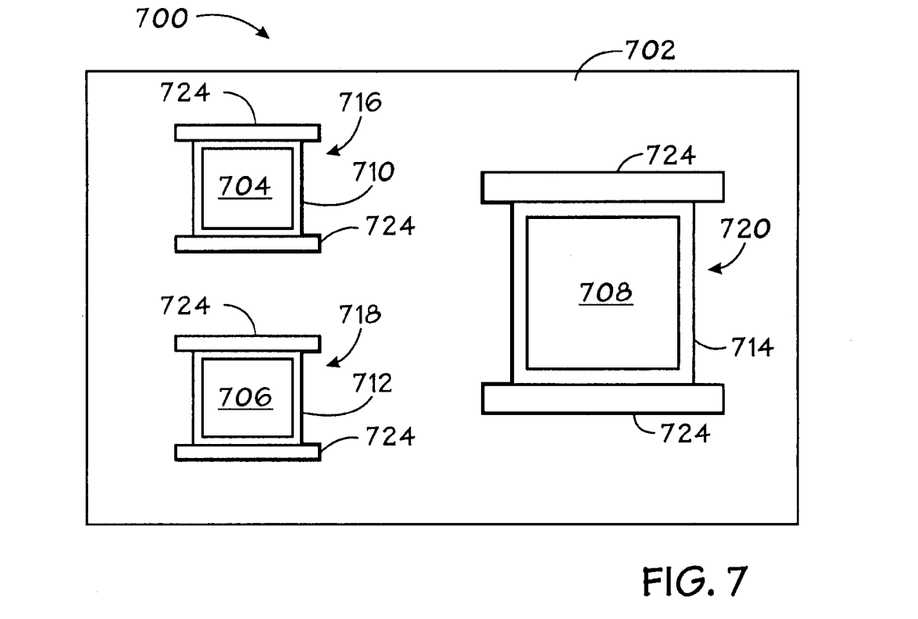
FIG. 7 is a top plan view of a multi-array imaging die or sensor configured for a motion detection function in accordance with an embodiment of the present invention.

FIG. 7 is a top plan view of a multi-array imaging die or sensor 700 that is configured to provide a motion detection function in accordance with another embodiment of the present invention. The image sensor 700 includes a substrate 702, a first pixel array 704, a second pixel array 706, and a pixel third array 708. It should be noted that, in some embodiments, a different number and arrangement of pixel arrays may be utilized. Each of the pixel arrays 704, 706, and 708 is disposed on the substrate 702 and cooperates with a corresponding one of a plurality of photographic lenses 710, 712, and 714 to form respective mini-cameras 716, 718, and 720. The mini-cameras 716, 718, and 720 may include filters and may be cumulatively or individually configured for specific purposes. For example, one or more of the pixel arrays 704, 706, and 708 may be employed as a motion detector.

In the illustrated embodiment, the first pixel array 704 and the second pixel array 706 are configured for motion detection. For example, the first and second arrays 704 and 706 may be optimized for high speed, high sensitivity, and/or low power consumption. Additionally, the first and second arrays 704 and 706 may be low resolution with fewer and larger pixels than the third pixel array 708. The motion sensing arrays 704 and 706 may be small relative to the imaging array 708 to conserve space on the substrate 702, which reduces costs. Additionally, the motion sensing arrays 704 and 706 can be low resolution, which conserves costs (e.g., energy savings), because motion detection can be achieved without substantially high resolution pixel arrays. Further, it may be desirable to include relatively large pixels in the first and/or second arrays 704 and 706 to increase light sensitivity, thus facilitating motion detection.

In accordance with present embodiments, more than one pixel array may be utilized as a motion detector to address different aspects of motion detection. Indeed, each of a number of pixel arrays may be configured with certain speed or light sensitivities to optimize performance under differing conditions. Specifically, in one embodiment, the first pixel array 704 may be configured for night applications and the second pixel array 706 may be configured for daylight applications. For example, the first pixel array 704 may be sensitive to infrared light to facilitate motion detection in low light environments, and the second pixel array 706 may include a Bayer filter to facilitate motion detection in high light environments.

Each of the first and/or second pixel arrays 704 and 706 may be configured to activate the third pixel array 708 and cause it to capture an image after motion is detected via a motion detection feature which may be controlled by circuitry 724. In other words, the cameras 716, 718, and 720 may cooperate to acquire photographic images based on detected motion by combining image acquisitions by one or more of the cameras 716, 718, and/or 720. Additionally, the first pixel array 704 may be configured to activate a flash mechanism after motion is detected. Accordingly, the first and/or second pixel array 704 and 706 may monitor (e.g., with a video surveillance function) a scene with high sensitivity and activate the third array 708 or a group of arrays when certain conditions are met (e.g., motion is detected) to capture an image. This functionality of the sensor 700 may be utilized in a security application to capture an image of a moving object when it is in position for a high resolution shot.

Because a motion detecting pixel array (e.g., pixel arrays 704 and 706) can be low resolution, such an array can be smaller than a pixel array utilized to capture images (e.g., pixel array 708). For example, in the illustrated embodiment, the first and second pixel arrays 704 and 706, which may be utilized for motion detection, are substantially smaller than the third pixel array 708, which may be utilized to capture high resolution images and may be configured to utilize higher levels of power. This may conserve space on the substrate 702 and improve cost efficiency. Additionally, reduced pixel array size may optimize power consumption. Optimizing the motion detecting pixel arrays for low power consumption may enable a low resolution surveillance function with extended battery life. When a predetermined condition is met (e.g., motion is detected), a higher resolution array or arrays may be activated to provide higher resolution imagery at the expense of higher power consumption. For example, the third pixel array 708 may be awoken from a sleep mode as a result of detected motion by the first and or second arrays 704 and 706. Because relatively few pixels are employed in each of the first and second pixel arrays 704 and 706, motion detection can be achieved with lower power consumption and higher speed compared to a monolithic array, while also providing high resolution capability when needed.

Figure 8:
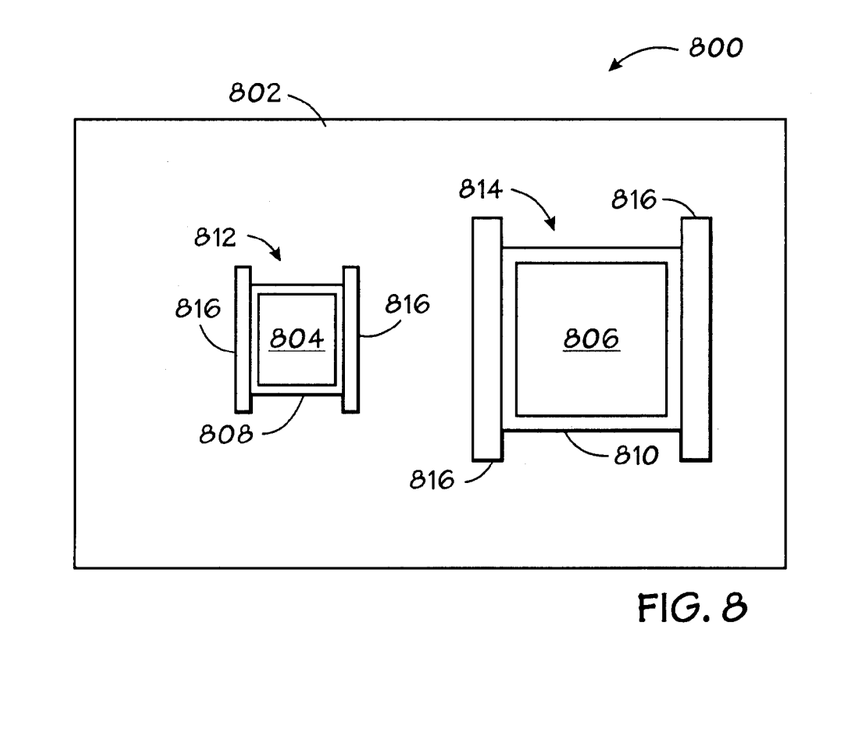
FIG. 8 is a top plan view of a multi-array imaging die or sensor configured for integrated motion blur reduction in accordance with an embodiment of the present invention.

FIG. 8 is a top plan view of a multi-array imaging die or sensor 800 configured for integrated motion blur reduction in accordance with another embodiment of the present invention. The image sensor 800 includes a substrate 802, a first pixel array 804, and a second pixel array 806. It should be noted that, in some embodiments, a different number and arrangement of pixel arrays may be utilized. Each of the pixel arrays 804 and 806 is disposed on the substrate 802 and cooperates with a corresponding one of a pair of photographic lenses 808 and 810 to form respective first and second mini-cameras 812 and 814. The mini-cameras 812 and 814 may include filters and may be cumulatively or individually configured for specific purposes. For example, in accordance with present embodiments, the cameras 812 and 814 may be cooperatively configured to effectively "freeze" scene motion in a captured image and combine to provide a high resolution image of the scene without distortion (e.g., blurring). Further, the image sensor 800 may include circuitry 816 that controls certain sensor functions (e.g., shutter functions and image combination functions).

It may be desirable to utilize present embodiments to acquire a high resolution image of a scene with motion present (e.g., a subject moving through the scene). Such image acquisition can be difficult with certain traditional techniques. For example, a rolling shutter camera may include image distortions (e.g., blurring) when utilized to capture a scene with motion. Such distortions may arise because rolling shutter cameras essentially capture an image by activating individual rows of pixels in a sequence until a full array of the pixels has been exposed. Accordingly, the image being captured may change, due to movement, between acquiring image data for a first row of pixels and a second row of pixels. Some techniques may attempt to address this issue solely with a global shutter function which exposes an entire pixel array to essentially capture an entire scene with a single activation. However, global shutter functions can be inefficient. For example, a global shutter camera that employs a high resolution pixel array could require a substantial amount of circuitry (e.g., memory), making the camera undesirably large.

It is now recognized that the single image sensor 800 may incorporate a global shutter camera and a rolling shutter camera that cooperate to provide a high resolution picture with limited distortion. In the illustrated embodiment of FIG. 8, the first camera 812 is configured to take fast, low blur images and the second camera 814 is configured to take high resolution images. The first camera 812 may utilize a pixel size and arrangement optimized for speed. For example, the first camera 812 may be configured to perform a global shutter function and the first pixel array 804 may have relatively few pixels (e.g., low resolution) to enable rapid image acquisition. It may be desirable for the first camera 812 to be substantially smaller than the second camera 814 because the image acquired with the global shutter function will be stored, which requires substantial memory. Accordingly, the resolution of the first pixel array 804 may be optimized for as low a resolution as will allow proper functionality. The second camera 814 may be optimized for quality image acquisition. For example, the second camera 814 may utilize a rolling shutter and the second pixel array 806 may include a relatively high number of pixels (e.g., high resolution).

In accordance with present embodiments, the first camera 812 and the second camera 814 may combine functionality to provide a superior image. The first camera 812 may capture one or more low resolution images of a scene that essentially freeze the scene in time. The second camera 814 may capture a higher resolution image, which may include motion distortion (e.g., blurring) due to a subject's motion through the scene. To correct the blurring, the image acquired by the first camera 812 may be utilized as a reference for adjusting the higher resolution data acquired by the second camera. For example, in one embodiment, the first camera 812 includes a video sensor that takes multiple images to facilitate motion analysis, which facilitates determination of an object's variable speed.

Figure 9:
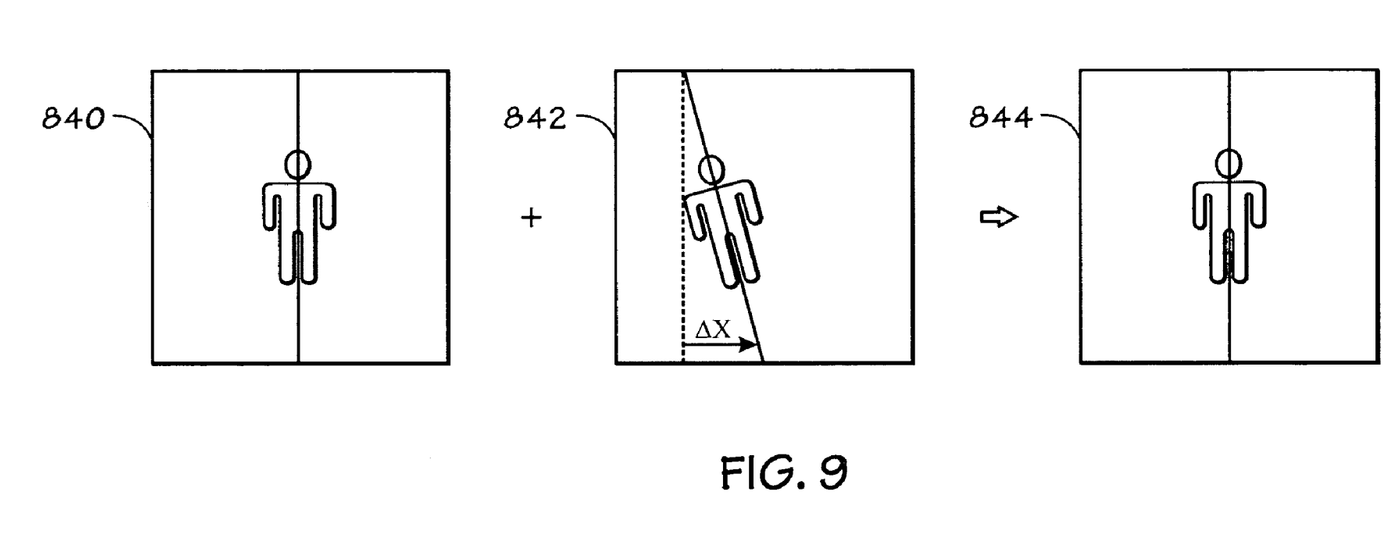
FIG. 9 figuratively illustrates a process for combing image data to correct for motion distortion in accordance with an embodiment of the present invention.

FIG. 9 figuratively illustrates a process for combining image data to correct for motion distortion using embodiments such as that illustrated in FIG. 8. Specifically, FIG. 9 illustrates a first image 840, a second image 842, and a corrected image 844. The first image 840 represents one or more low resolution images with little or no motion distortion acquired using a global shutter function. The second image 842 represents a high resolution image with motion distortion, as illustrated by a change 846 in image data (Δx). This change (Δx) may be the result of camera movement or movement of the subject being photographed.

Because the camera scans pixels by rows or columns, the change may progress from one side of an image to the other, as illustrated by the gradual shift in image 842 from the top to the bottom of the image 842. Each of the images 840 and 842 may include lines of pixel data that form the images, respectively. Lines of pixel data from one or more images 840 acquired by the first camera 812 may be extracted and compared to lines of pixel data in an image 842 acquired by the second camera 814. Based on this comparison, corresponding image data between the two images 840 and 842 may be adjusted to reflect the movement captured by the second camera 814 in a high resolution image with reduced blurring (i.e., corrected image 844). In other words, pixel-wise or row-wise correction of the image 842 may be achieved by comparing related pixels in each of the first and second images 840 and 842, and/or using a calculated speed of the moving subject. It should be noted that such comparisons may include assumptions regarding continuity of subjects in a scene. For example, a scene including a tree may assume the tree is contiguous based on similar pixel data that establishes a pattern (e.g., the shape of the tree).

In some embodiments, motion artifacts may be analyzed and/or corrected with rolling shutter integration. This rolling shutter integration may be performed either without or in combination with a global shutter array. In one embodiment, two or more images may be acquired using separate cameras with rolling shutters. If two cameras are utilized, each of the cameras may begin an image capture from opposite ends of their respective arrays. In other words, the cameras may capture a scene beginning on different sides of the scene and scrolling through the scene capturing lines of image data. Further, if additional cameras are utilized, image captures may begin from various different sides of the corresponding arrays. For example, four parallel rectangular arrays may be employed and image captures may begin from a different side in each array. Accordingly, the images acquired by the arrays may be integrated such that substantial detail from a scene is captured in an image without motion distortion. That is, motion related artifacts may be removed or reduced based on the image data captured by the multiple cameras by combining select portions of each acquired image. The image data may be combined based on analysis of the data and scene measurements. It should be noted that rolling shutter integration may facilitate acquisition of speed of movement information, which may be utilized to construct an image of the scene without movement artifacts.

Figure 10:
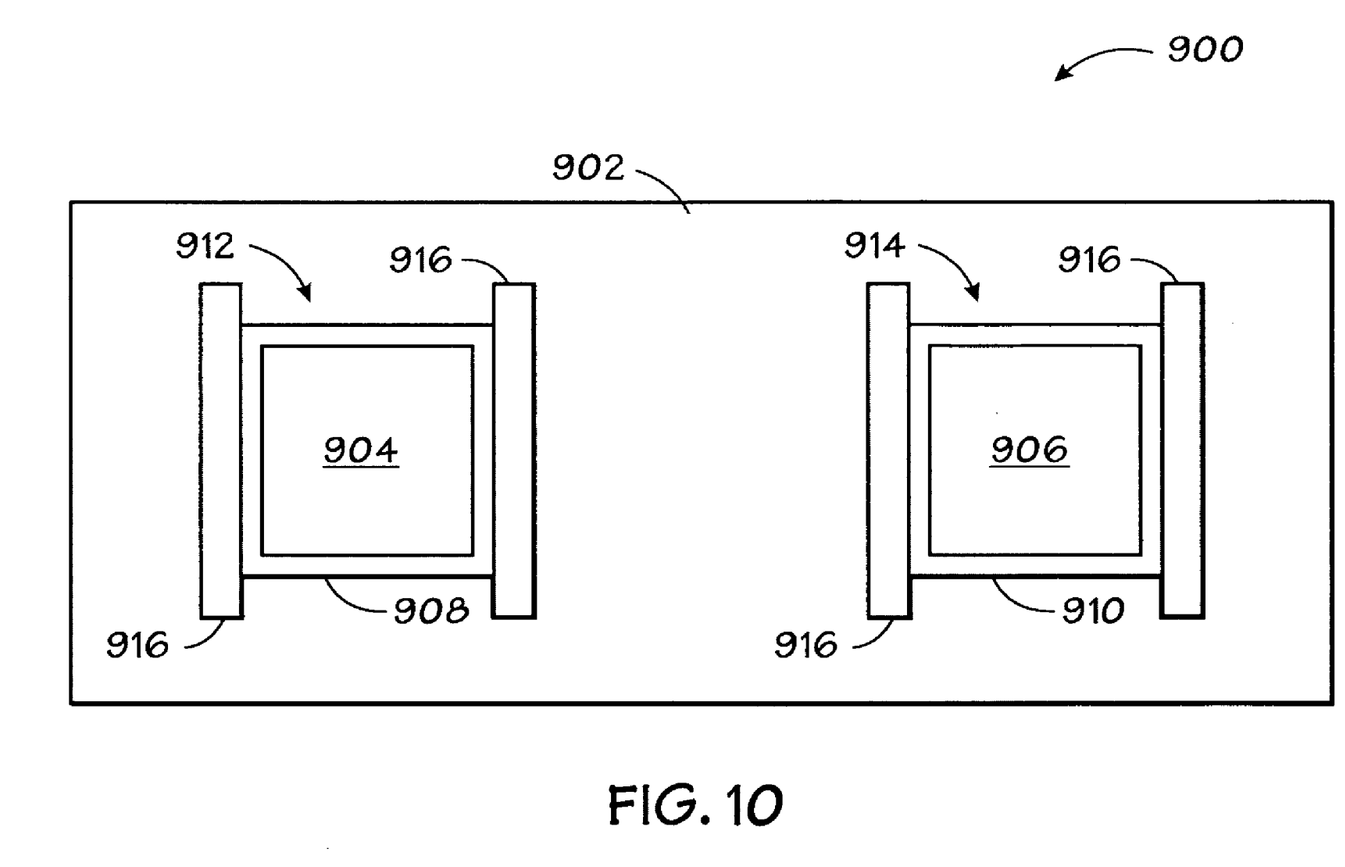
FIG. 10 is a top plan view of a multi-array imaging die or sensor configured for producing an image with a high dynamic range in accordance with an embodiment of the present invention.

FIG. 10 is a top plan view of a multi-array imaging die or sensor 900 configured for producing an image with a dynamic range of exposure data. The image sensor 900 includes a substrate 902, a first pixel array 904, and a second pixel array 906. It should be noted that, in some embodiments, a different number and arrangement of pixel arrays may be utilized. For example, multiple pixel arrays may be utilized to cover more specific exposure ranges. In the illustrated embodiment, each of the pixel arrays 904 and 906 is disposed on the substrate 902 and cooperates with a corresponding one of a pair of photographic lenses 908 and 910 to form respective first and second mini-cameras 912 and 914. The mini-cameras 912 and 914 may include filters and may be cumulatively or individually configured for specific purposes. For example, in accordance with present embodiments, the cameras 912 and 914 may be cooperatively configured to provide an image with detailed bright and dark image features. The cameras 912 and 914 may be coordinated by circuitry 916 to facilitate proper image combination.

It may be desirable to capture an image of a scene that includes both relatively bright areas and relatively dark areas. For example, a landscape scene may include an area that is shadowed and an area that is in direct sunlight. Some traditional image capturing techniques are not capable of capturing the details of such a scene because exposure settings in such traditional techniques may only be adapted for one level of brightness. Specifically, for example, a monolithic array may include pixels with a limited well capacity that causes saturation and possibly blooming when exposed to bright light or pixels that are undersized for capturing scene areas with low exposure levels.

Accordingly, embodiments of the present invention may include both an array with pixel architecture configured for low exposure levels and a separate array with pixel architecture configured for high exposure levels. Indeed, in the illustrated embodiment, the first pixel array 904 is optimized for low exposure levels and the second pixel array 906 is optimized for high exposure levels. For example, the first pixel array 904 may include relatively large pixels with an appropriate integration time, and special blooming protection to facilitate capturing images of scene elements with low exposure levels. The second pixel array 906 may include relatively small pixels with an appropriate integration time and higher resolution to facilitate capturing images of scene elements that are normally lighted. Respective images captured by the first pixel array 904 and the second pixel array 906 may be fused together to provide a superior image. For example, saturated or blooming areas of an image produced by the first camera 912 may be replaced with detail available from an image produced by the second camera 915. Thus, the modified image may include detail for both light and dark areas in the scene.

It should be noted that, as would be understood by one of ordinary skill in the art, aspects of the embodiments discussed above may be combined in other implementations of multi-array imagers in accordance with present embodiments. For example, in one embodiment, an infrared and/or color video camera with a low resolution array could be integrated with one or more larger, high resolution arrays onto a single imaging die. In such an embodiment, a processor could analyze video streams from the color video camera and control or trigger image capturing with the high resolution arrays depending on scene content. Also, different imaging solutions (e.g., exposure metering, motion sensing, and blur reduction) may be integrated onto the single imaging die.

While the present invention may be susceptible to various modifications and alternative forms, specific embodiments have been shown by way of example in the drawings and the above description. However, it should be understood that the present invention is not intended to be limited to the particular forms disclosed. Rather, the present invention is to cover all modifications, equivalents and alternatives falling within the spirit and scope of the present invention as defined by the following appended claims.

What is claimed is:

1. An image sensor, comprising:
    a first pixel cell array disposed on a substrate;
    a first photographic lens arranged to focus light onto the first pixel cell array, wherein the first pixel cell array and the first photographic lens are configured to cooperate to capture a first image of a scene with a global shutter function;
    a second pixel cell array disposed on the substrate;
    a second photographic lens arranged to focus light onto the second pixel cell array, wherein the second pixel cell array and the second photographic lens are configured to cooperate to capture a second image of the scene with a rolling shutter function, wherein the first pixel cell array has a lower resolution than the second pixel cell array; and
    an image coordination circuit configured to coordinate the first array and lens with the second array and lens to provide an image.

2. The image sensor of claim 1, wherein the image coordination circuit is configured to sequentially activate two or more of a plurality of pixel cell arrays on the substrate.

3. The image sensor of claim 2, wherein the image coordination circuit is configured to manipulate operational characteristics of the second array based on the first image.

4. The image sensor of claim 1, wherein the first array is configured to detect motion.

5. The image sensor of claim 4, wherein the second array is configured to capture the second image when motion is detected via the first array, wherein the second array has a higher resolution than the first array.

6. An image sensor, comprising:
    a first pixel cell array disposed on a substrate;
    a first photographic lens arranged to focus light onto the first pixel cell array, wherein the first pixel cell array and the first photographic lens are configured to cooperate to capture a first image of a scene with a global shutter function;
    a second pixel cell array disposed on the substrate;
    a second photographic lens arranged to focus light onto the second pixel cell array wherein the second pixel cell array and the second photographic lens are configured to cooperate to capture a second image of the scene with a rolling shutter function; and
    an image coordination circuit configured to provide an image of the scene by adjusting for motion blurring in the second image based on utilization of the first image as a template.

7. A method, comprising: focusing light with a first photographic lens onto a first pixel cell array disposed on a substrate; capturing a first image of a scene using the first pixel cell array with a rolling shutter function beginning from a first side of the scene; focusing light with a second photographic lens onto a second pixel cell array disposed on the substrate; capturing a second image of the scene using the second pixel cell array with a rolling shutter function beginning from a second side of the scene; and coordinating the first array and lens with the second array and lens with an image coordination circuit to provide a final image of the scene.

8. The method of claim 7, wherein the image coordination circuit is configured to manipulate operational characteristics of the second array based on the first image.

9. A method, comprising:
    focusing light onto a first pixel cell array of a substrate with a first photographic lens such that cooperation between the first pixel cell array and the first photographic lens provides a first image of a scene with a global shutter function;
    focusing light onto a second pixel cell array of the substrate with a second photographic lens such that cooperation between the second pixel cell array and the second photographic lens provides a second image of the scene with a rolling shutter function, wherein the first pixel cell array has a lower resolution than the second pixel cell array; and coordinating the first array and lens with the second array and lens with a coordination circuit to provide an image.

10. The method of claim 9, comprising manipulating operational characteristics of the second array based on the first image with the coordination circuit.

11. The method of claim 9, comprising adjusting an integration time of the second array based on a brightness measure of the first image.

12. The method of claim 9, comprising detecting motion with the first array.

13. The method of claim 12, comprising capturing the second image with the second array when motion is detected via the first array, wherein the second array has a higher resolution than the first array.

14. The method of claim 9, comprising adjusting for motion blurring in the second image based on utilization of the first image as a template.

15. The method of claim 7, further comprising: focusing light with a third photographic lens onto a third pixel cell array disposed on the substrate; capturing a third image of the scene using the third pixel cell array with a rolling shutter function beginning from a third side of the scene; and coordinating the first array and lens, the second array and lens and the third array and lens with the image coordination circuit to provide the final image of the scene.

16. The method of claim 15, further comprising: focusing light with a fourth photographic lens onto a fourth pixel cell array disposed on the substrate; capturing a fourth image of the scene using the fourth pixel cell array with a rolling shutter function beginning from a fourth side of the scene; and coordinating the first array and lens, the second array and lens, the third array and lens and the fourth array and lens with the image coordination circuit to provide the final image of the scene.

* * * * *